United States Patent [19]

Manico et al.

[11] Patent Number: 5,966,199
[45] Date of Patent: *Oct. 12, 1999

[54] INDEX PRINT

[75] Inventors: Joseph Anthony Manico, Rochester; Thomas Richard Roule, Mendon; William Davis Loveland, Penfield; Barton Anthony Pricola, Brockport, all of N.Y.

[73] Assignee: Eastman Kodak Company, Rochester, N.Y.

[*] Notice: This patent is subject to a terminal disclaimer.

[21] Appl. No.: 09/062,122

[22] Filed: Apr. 17, 1998

Related U.S. Application Data

[63] Continuation of application No. 08/413,148, Mar. 29, 1995, Pat. No. 5,748,284.

[51] Int. Cl.⁶ .............................. G03B 27/32; G03B 27/52
[52] U.S. Cl. ............................... 355/39; 355/40; 355/41; 355/77
[58] Field of Search ..................... 355/64, 54, 39–41, 355/77; 206/455

[56] References Cited

U.S. PATENT DOCUMENTS

| | | | |
|---|---|---|---|
| 4,720,733 | 1/1988 | Ontake et al. | 355/64 |
| 4,805,039 | 2/1989 | Ohkake et al. | 306/383 |
| 4,896,186 | 1/1990 | Tokuda | 355/40 |
| 4,933,773 | 6/1990 | Shiota et al. | 355/32 |
| 5,031,773 | 7/1991 | Manico et al. | 355/64 |
| 5,184,227 | 2/1993 | Foley | 358/302 |

*Primary Examiner*—D. Rutledge
*Attorney, Agent, or Firm*—Gordon M. Stewart

[57] ABSTRACT

An index print includes a recording sheet having positive images corresponding to respective images on an image recording medium and being right-side-up or up-side-down on the recording sheet. The index print further includes eye-readable means on the recording sheet which relate to the positive images. The invention is characterized in that the eye-readable means is positioned relative to the positive images to permit at least a portion of the eye-readable means to be read without being up-side-down on the recording sheet when viewing the positive images right-side-up on the recording sheet, whether the positive images are recorded right-side-up or up-side-down on the recording sheet.

20 Claims, 8 Drawing Sheets

5,966,199

INDEX PRINT

CROSS REFERENCE TO RELATED APPLICATIONS

This is a continuation of application Ser. No. 08/413,148, filed Mar. 29, 1995, now U.S. Pat. No. 5,748,284.

FIELD OF THE INVENTION

The invention relates generally to the field of imaging, and in particular to visible positive images. More specifically, the invention relates to an index print.

BACKGROUND OF THE INVENTION

Some cameras on the market require that the film cartridge be loaded on the left side of the camera when viewing the camera from the back (a left-side-load camera). Other cameras require that the film cartridge be loaded on the right side of the camera when viewing the camera from the back (a right-side-load-camera). The film cartridge in the right-side load camera is in an inverted position compared to a film cartridge in a left-side-load camera. As a result, images recorded by a right-side-load camera will be inverted on the filmstrip relative to images recorded by a left-side-load camera.

FIG. 1 shows a processed photographic filmstrip 90 (image recording medium) having a plurality of images 100 which were recorded on the filmstrip by a left side load camera. Filmstrip 90 also includes a human readable manufacturer's information code 110 adjacent a top edge of the filmstrip and, a human readable frame number 120 and machine readable frame number 130 adjacent a bottom edge of the filmstrip. Note that images 100 are right-side up on the filmstrip relative to code 110 and, frame numbers 120 and 130. FIG. 2 shows a processed photographic filmstrip 90 having a plurality of images 100 which were recorded on the filmstrip by a right side load camera. Note that images 100 are up-side down on the filmstrip relative to code 110 and, frame numbers 120 and 130.

An index print can be made from images 100 stored on filmstrip 90. The index print is typically a plurality of small positive images recorded on one or more recording sheets. The positive images correspond to images, stored on an image recording medium, which may be difficult or impossible to view with the unaided eye. FIG. 3 shows an index print 135 which includes a recording sheet 140 on which are recorded a plurality of positive images 150 which correspond to the images 100 on filmstrip 90. The index print also includes eye-readable-indicia such as a header 145 which has information relating to the positive images. Another eye-readable-indicia is a reference symbol 160 which in this case is a frame number corresponding to the frame number on filmstrip 90. Index print 135 was made by utilizing images 100 on filmstrip 90 in FIG. 1. Note that images 150 are right-side-up relative to the eye-readable-indicia.

Index print 135 can be made on the Kodak Digital Index Print System (DIPS). With the DIPS, the filmstrip is always fed into a film scanner in the same orientation. The film scanner does not know whether the filmstrip has images that were recorded by a right-side-load or left-side-load camera. As a result, as shown in FIG. 4, an index print made on the DIPS with a filmstrip exposed in a right-side-load camera will have images 150 which are up-side-down relative to the eye-readable-indicia such as header 145 and reference symbols 160. Thus, when viewing the eye-readable-indicia in a right-side-up position the positive images are up-side-down and vice-versa. Such an arrangement is less than optimal.

SUMMARY OF THE INVENTION

The present invention is directed to overcoming one or more of the problems set forth above. Briefly summarized, according to one aspect of the present invention, an index print includes a recording sheet having positive images corresponding to respective images on an image recording medium and being right-side-up or up-side-down on the recording sheet. The index print further includes eye-readable means on the recording sheet which relate to the positive images. The invention is characterized in that the eye-readable means is positioned relative to the positive images to permit at least a portion of the eye-readable means to be read without being up-side-down on the recording sheet when viewing the positive images right-side-up on the recording sheet, whether the positive images are recorded right-side-up or up-side-down on the recording sheet.

As a result, a viewer of the index print will be able to simultaneously observe both the positive images and at least a portion of the eye-readable-means whether the filmstrip was recorded in a left-side-load or right-side-load camera.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
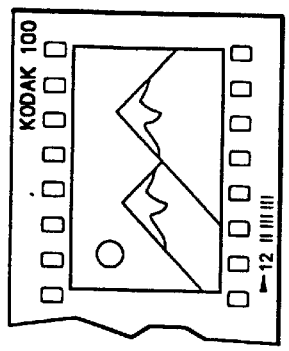
FIG. 1 is a schematic representation of a prior art photographic filmstrip exposed in a left-side-load camera.
Figure 1:
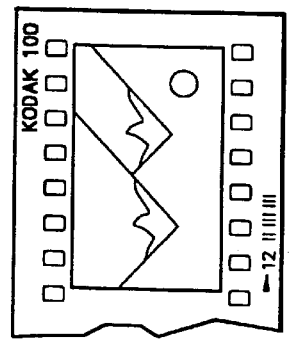
Figure 1:
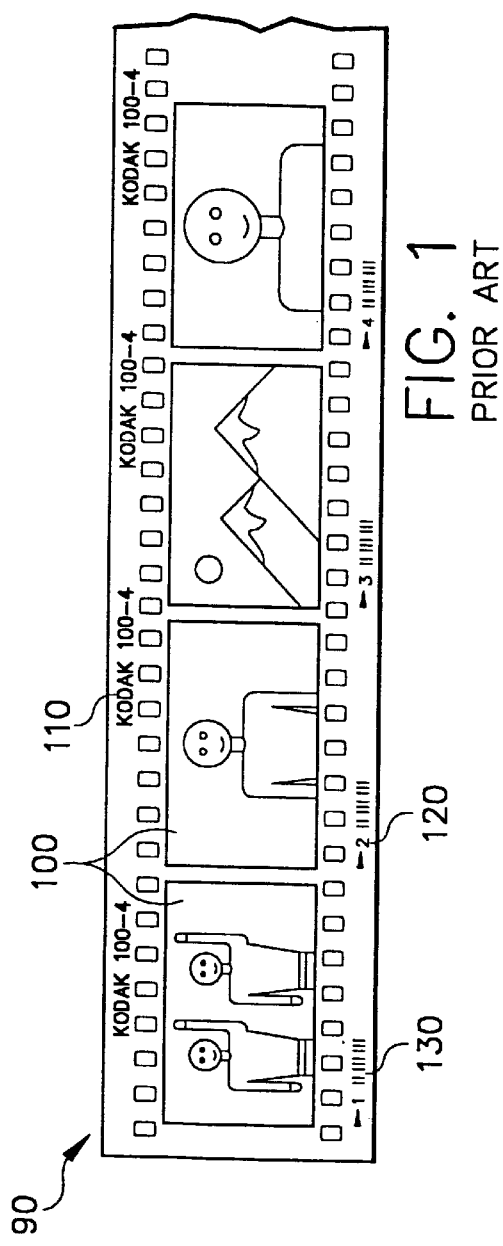
Figure 5:
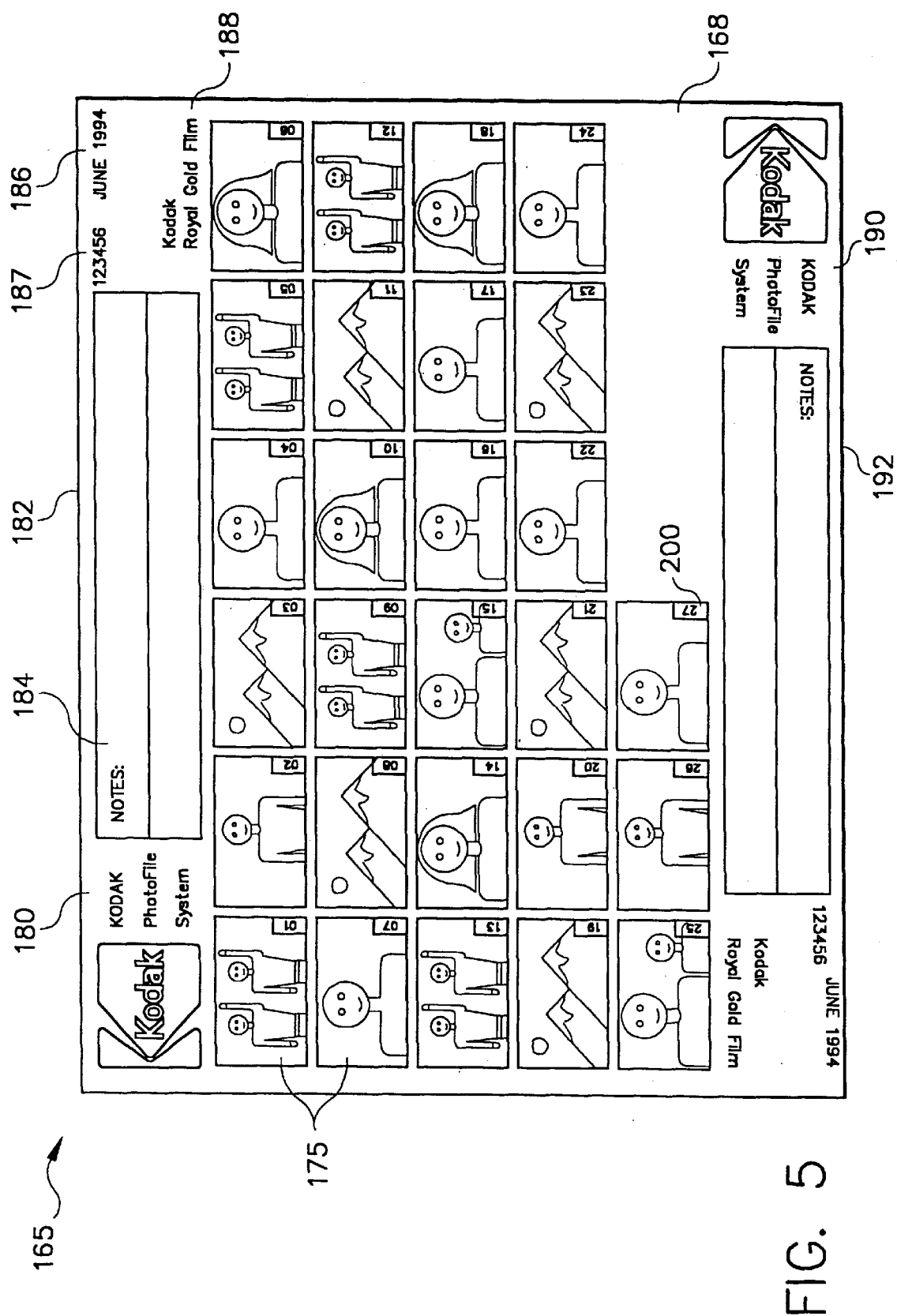
FIG. 5 is an index print in accordance with the invention made from the photographic filmstrip of FIG. 1.

Beginning with FIG. 5, an index print 165 includes a recording sheet 168 having positive images 175 corresponding to respective images on an image recording medium such as filmstrip 90 of FIG. 1. Images 175 are right-side-up on the recording sheet in FIG. 5 because the images on filmstrip 90 were recorded in a left-side-load camera. Also included on the recording sheet are eye-readable indicia which have information relating to the positive images. The eye-readable indicia include a pair of headers 180, 190 which are substantially similar to each other. Information in the headers includes, for example, an area 184 in which the owner of the index print can write notes which relate to the images 175. Also included are a date 186 during which the film was processed, a customer order ID number 187 and a film type 188 on which images 100 (FIG. 1) were recorded.

Figure 6:
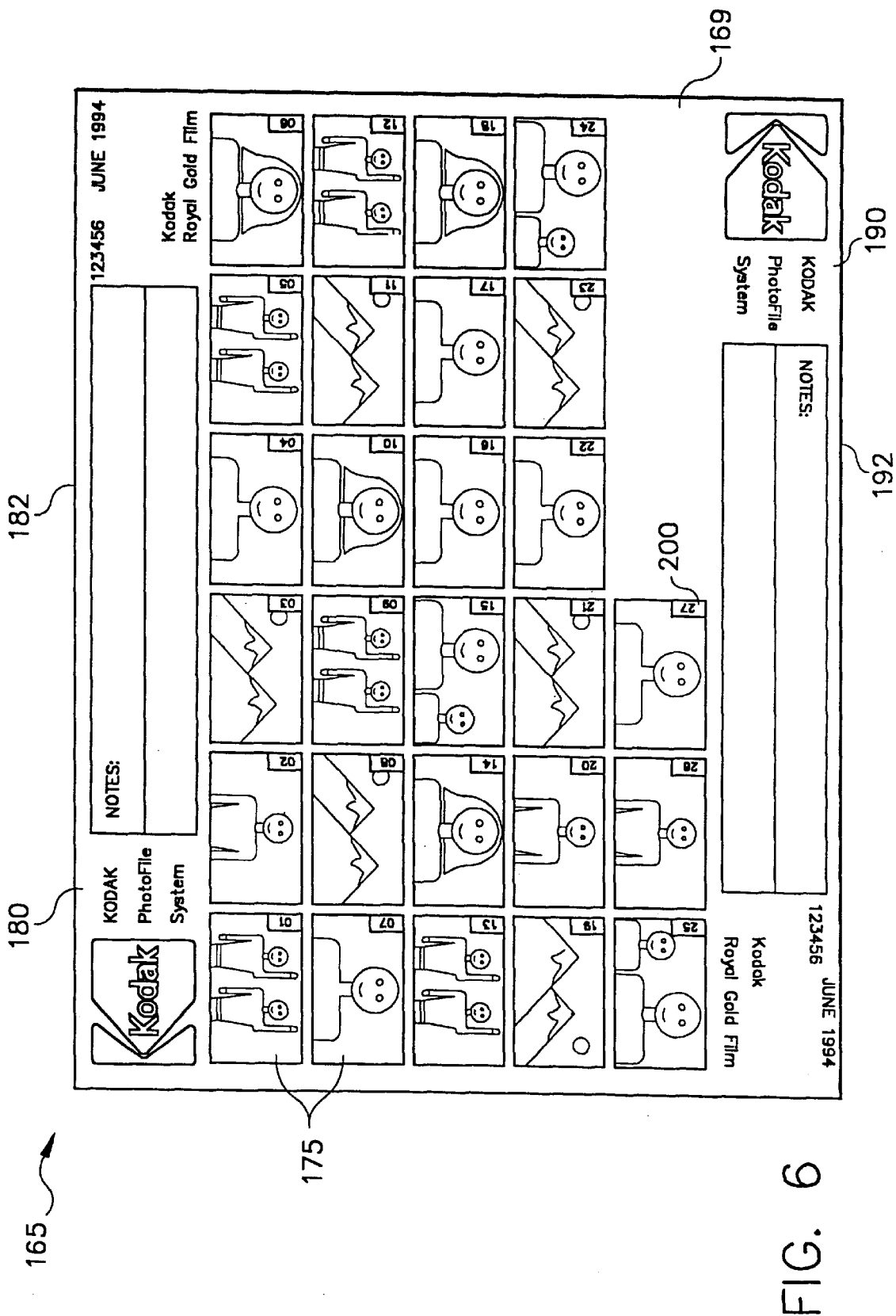
FIG. 6 is an index print in accordance with the invention made from the photographic filmstrip of FIG. 2.

In FIG. 5, header 180 is positioned right-side-up on the recording sheet relative to the images 175 adjacent a top edge 182 of sheet 168 while header 190 is positioned up-side-down on sheet 168 relative to images 175 adjacent a bottom edge 192 of the recording sheet. FIG. 6 shows an index print 166 similar to index print 165 of FIG. 5 except that images 175 are up-side-down on the recording sheet in FIG. 5 because the images on filmstrip 90 (FIG. 2) were recorded in a right-side-load camera. Thus, in FIG. 6, header 180 is positioned up-side-down on the recording sheet relative to the images 175 adjacent top edge 182 of sheet 169 while header 190 is positioned right-side-up on sheet 169 relative to images 175 adjacent a bottom edge 192 of the recording sheet.

As a result, either header 180 or header 190 can be read without being up-side-down on the recording sheet when viewing the positive images right-side-up on the recording sheet, whether the positive images are recorded right-side-up or up-side-down on the recording sheet. Viewing of the header information is thereby enhanced regardless of whether the images were recorded on the filmstrip in a right or left-side load camera.

Figure 2:
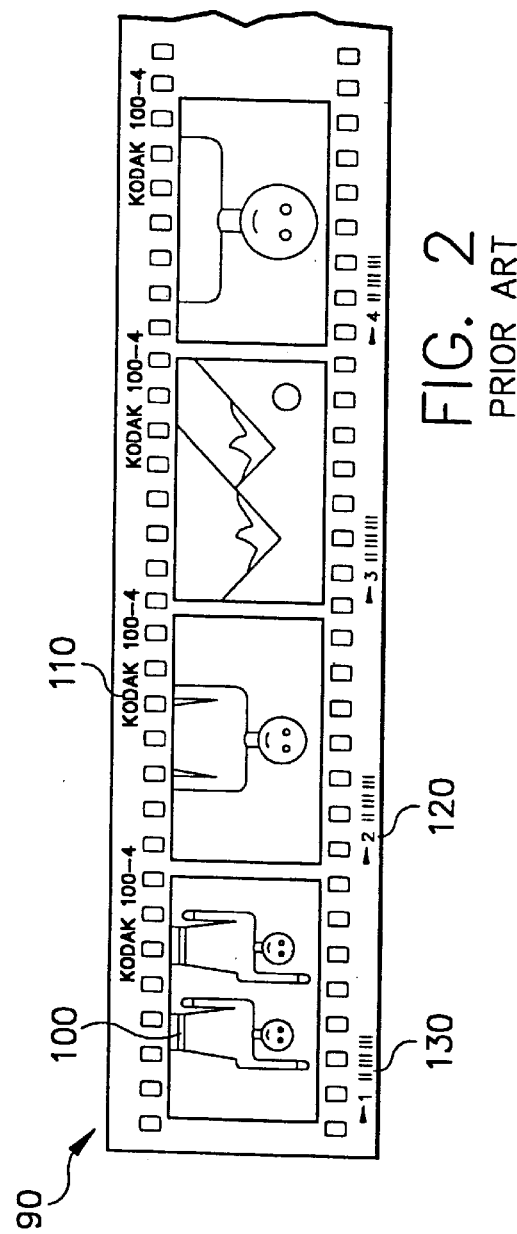
FIG. 2 is a schematic representation of a prior art photographic filmstrip exposed in a right-side-load camera.
Figure 3:
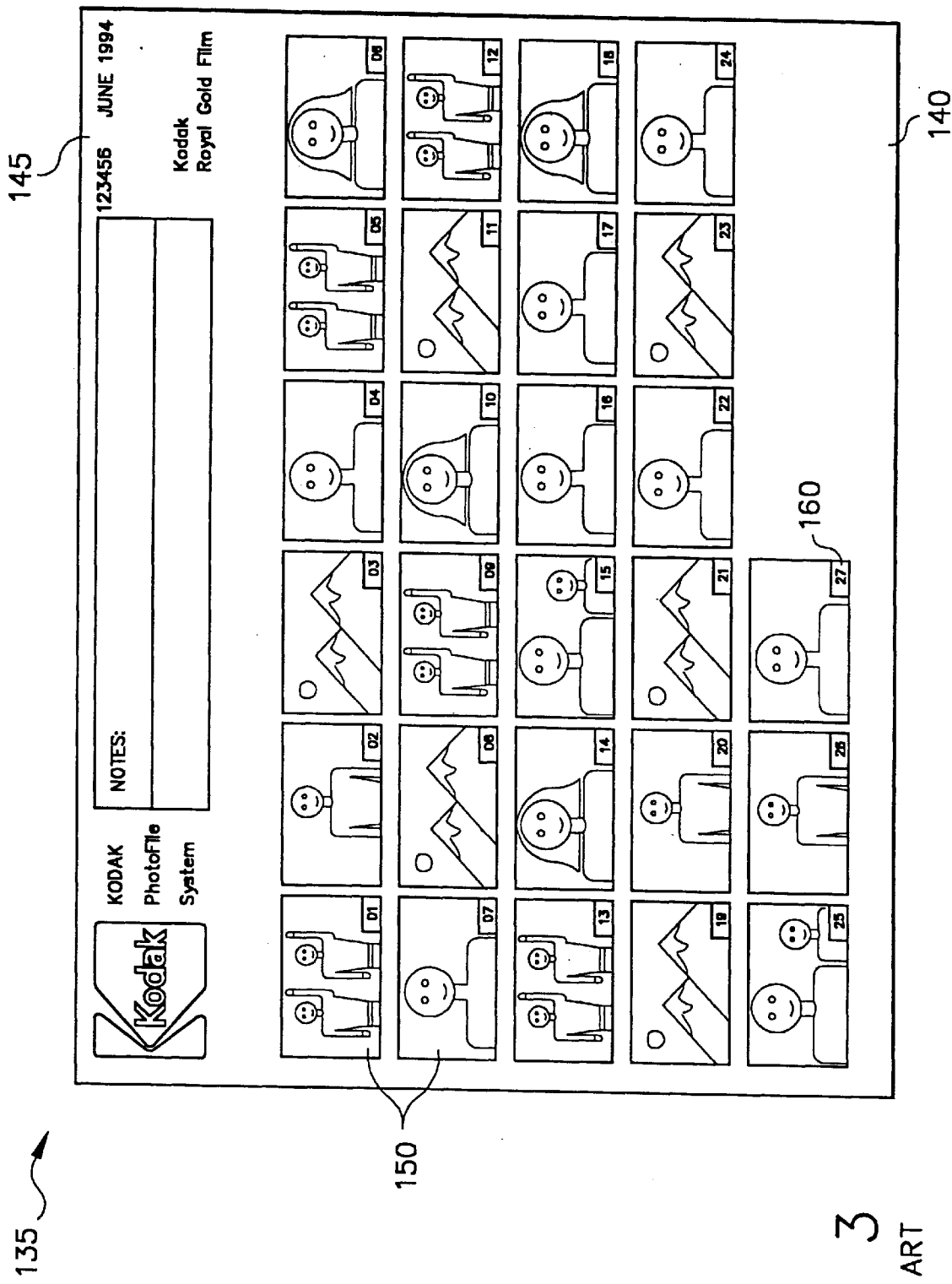
FIG. 3 is a prior art index print made from the photographic filmstrip of FIG. 1.
Figure 4:
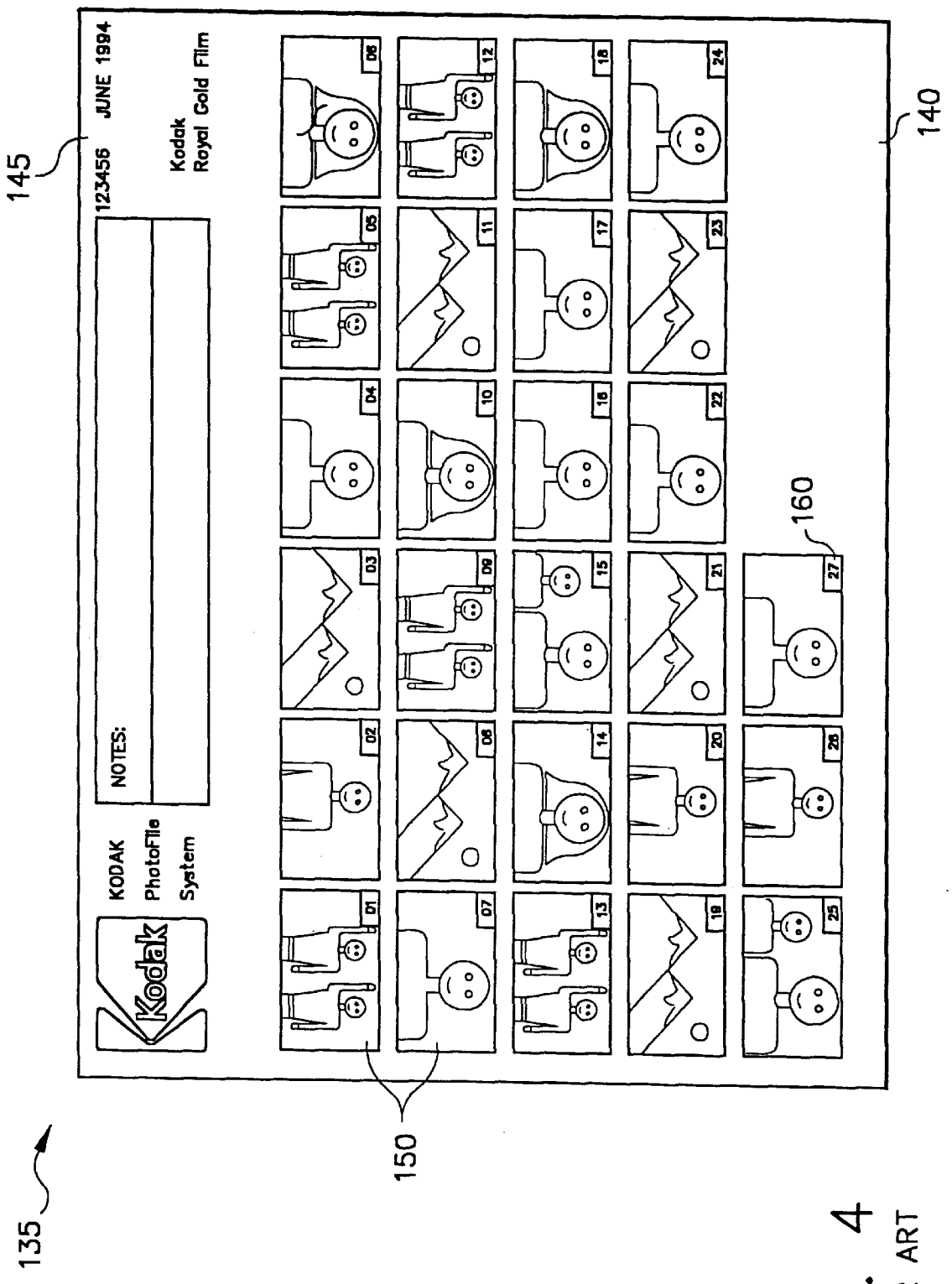
FIG. 4 is a prior art index print made from the photographic filmstrip of FIG. 2.

The index prints of FIGS. 5 and 6 have additional eye-readable indicia which includes a reference symbol, such as frame number 200, for each positive image 175. The frame numbers correspond to human readable frame number 120 and machine readable frame number 130 on filmstrip 90 (FIGS. 1 and 2). Note that the frame numbers are arranged on the recording sheet to be sideways (rotated 90 degrees relative to images 175) relative to the positive images whether the positive images are right-side-up (FIG. 5) or up-side-down (FIG. 6) on the recording sheet. As a result, frame numbers 200 can be read without being up-side-down on the recording sheet when viewing the positive images right-side-up on the recording sheet, whether the positive images are recorded right-side-up or up-side-down on the recording sheet. Viewing of the frame numbers is thereby enhanced regardless of whether the images were recorded on the filmstrip in a right or left-side load camera.

Figure 7:
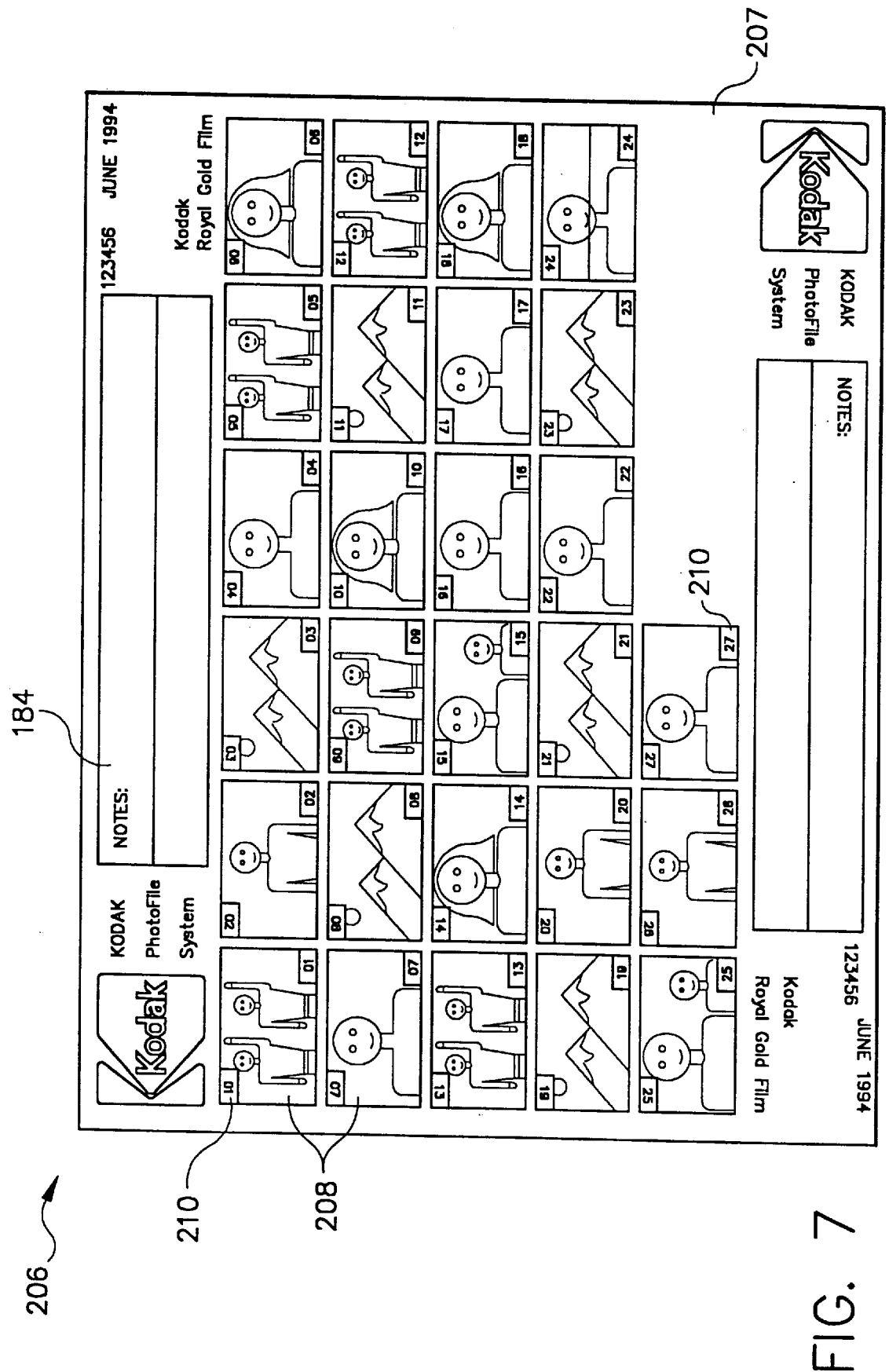
FIG. 7 is an index print in accordance with an additional embodiment of the invention made from the photographic filmstrip of FIG. 1.
Figure 8:
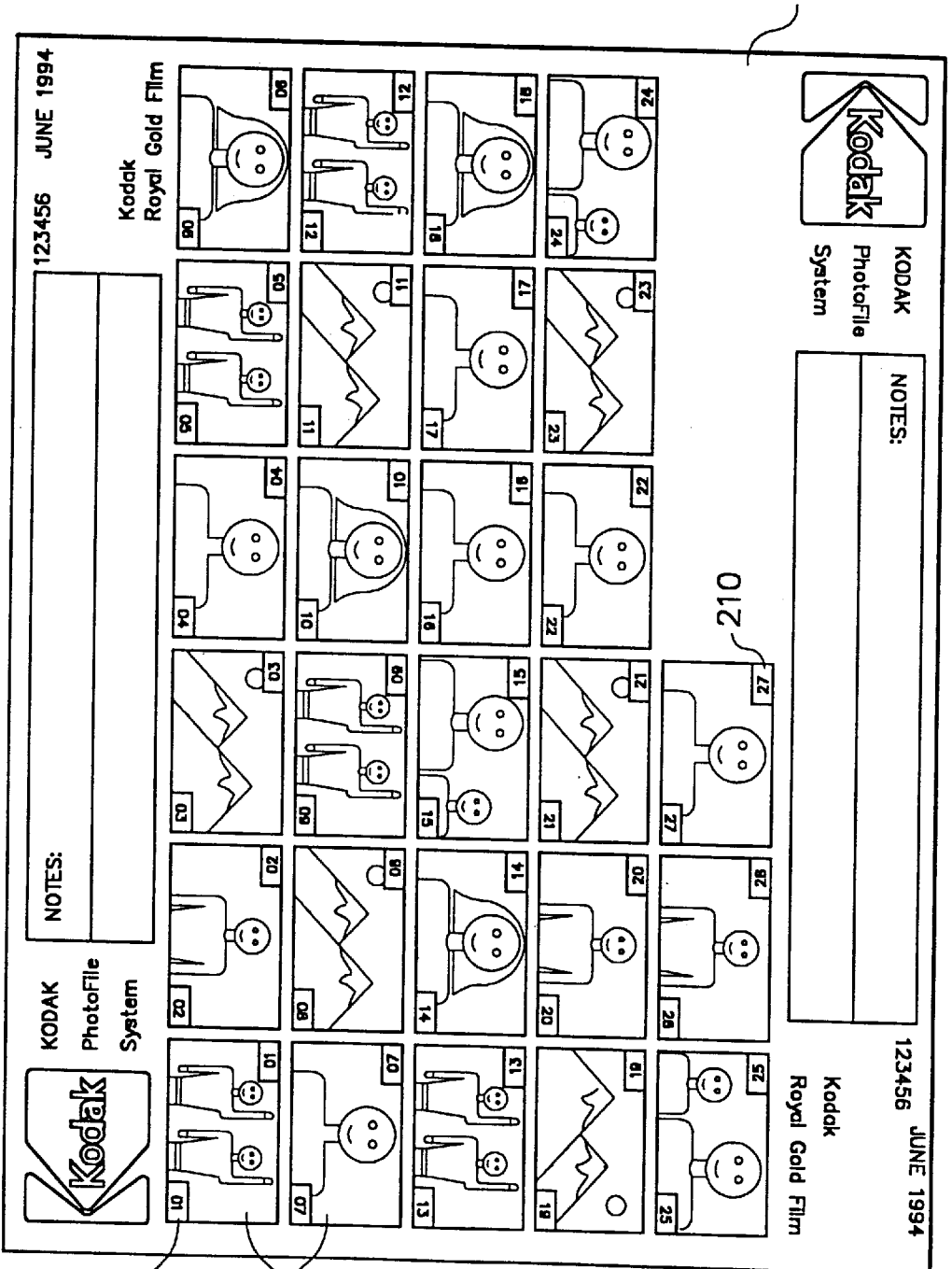
FIG. 8 is an index print in accordance with an additional embodiment of the invention made from the photographic filmstrip of FIG. 2.

Turning to FIGS. 7 and 8, a further embodiment of the present invention is shown. FIGS. 7 and 8 display an index print 206 similar to the index prints of FIGS. 5 and 6. However, frame number 200 of FIGS. 5 and 6 has been replaced by an alternative eye-readable indicia which includes a pair of reference symbols, such as frame numbers 210,220, for each positive image 208. One of the frame numbers in each pair is positioned right-side-up on the recording sheet 207 relative to the positive images and the other of the pair of frame numbers is positioned up-side-down on the recording sheet relative to the positive images. As a result, at least one of frame numbers 210, 220 can be read without being up-side-down on the recording sheet when viewing the positive images right-side-up on the recording sheet, whether the positive images are recorded right-side-up or up-side-down on the recording sheet. Viewing of the frame numbers is thereby enhanced regardless of whether the images were recorded on the filmstrip in a right or left-side load camera.

Figure 9:
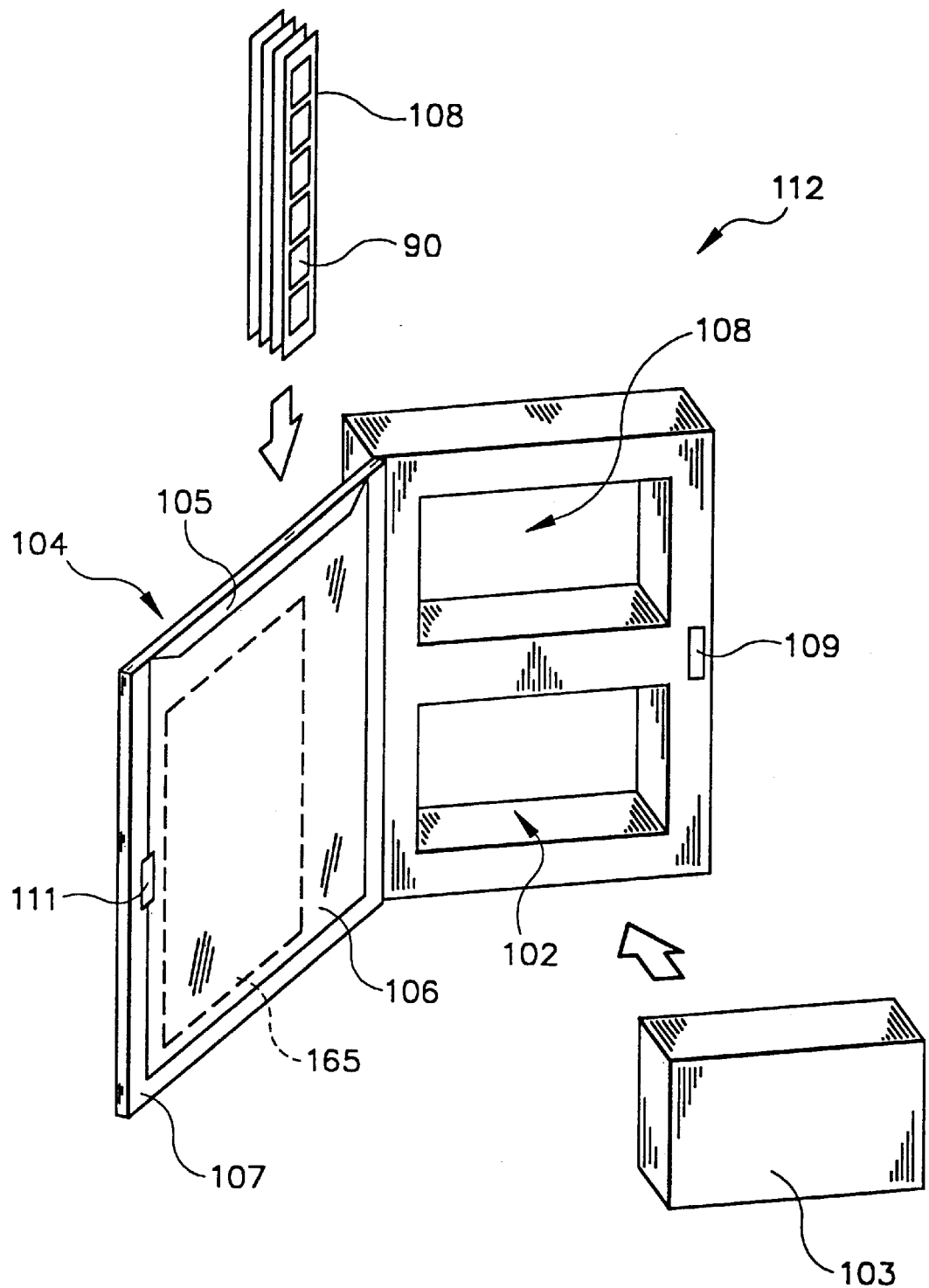
FIG. 9 shows an index print of the present invention in combination with an image recording medium (film) and photographs.

Referring to FIG. 9, index print 165 of the present invention is shown in combination with filmstrip 90 (an image recording medium) which has been cut into strips holding 6 images each. The strips are stored in a transparent sheath 108. A book shaped casing 112 includes two recesses 101,102, in which a number of printed photographs 103 are stored in a stack. The casing 100 is provided with a swingable cover 104. The cover 104 is formed on its internal surface with a pocket 105, in which index print 165 is inserted. Pocket 105 is formed by attaching, for example, three sides of a sheet 106 to cover 104. The attaching portion 107 is shown by hatching. Sheath 108 is also inserted into pocket 105. Reference numerals 109 and 110 denote pressure sensitive fasteners.

The index prints of the present invention can be made in any number of ways, including those disclosed in U.S. Pat. Nos. 4,805,039; 4,933,773; and 5,184,227, all of which are incorporated herein by reference. The index prints can also be made on the Kodak Digital Index Print System.

The invention has been described with reference to a preferred embodiment. However, it will be appreciated that variations and modifications can be effected by a person of ordinary skill in the art without departing from the scope of the invention. For example, although the invention has been described as solving a problem relating to film being exposed in right and left-side-load cameras, the present invention also solves the problem of image takers rotating their image recording apparatus to various orientations while recording images. For example, when a photographer rotates the camera 90 degrees to record a tall image. Additionally, although the disclosed image recording medium is disclosed as film, the present invention is applicable to other image recording medium such as magnetic tape, electronic image storage, etc.

The invention has been described in detail with particular reference to certain preferred embodiments thereof, but it will be understood that variations and modifications can be effected within the spirit and scope of the invention.

| PARTS LIST | |
|---|---|
| 90 | photographic filmstrip |
| 100 | images |
| 101,102 | recesses |
| 103 | photographs |
| 104 | cover |
| 105 | pocket |
| 106 | sheet |
| 107 | attaching portion |
| 108 | sheath |
| 109,111 | pressure sensitive fasteners |
| 110 | info./code |
| 120 | human readable frame number |
| 130 | machine readable frame number |
| 135,165,166,206 | index print |
| 140,168,169,207 | recording sheet |
| 150,175,208 | positive images |
| 145,180,190 | header |
| 160 | reference symbol |
| 182 | top edge |
| 184 | area |
| 186 | date |
| 187 | customer order ID number |
| 188 | film type |
| 192 | bottom edge |
| 200,210,220 | frame number |

What is claimed is:

1. An index print, comprising:
   a recording sheet having a top edge and a bottom edge;
   between said top and bottom edges, a plurality of positive images on said recording sheet, said positive images corresponding to respective images on a photographic image recording medium, said plurality of positive images being oriented either right-side-up toward said top edge or up-side-down toward said bottom edge, depending on an orientation of the recording medium in a photographic camera in which the respective images were exposed;

a top header on said recording sheet, said top header having visible information oriented right-side-up toward said top edge;

a bottom header on said recording sheet, said bottom header having visible information relating to said plurality of positive images, said visible information being oriented up-side-down toward said bottom edge; and whereby a person viewing said index print can orient said positive images right-side-up and be able to read one of said top header and said bottom header, without said one header being up-side-down as read.

2. An index print according to claim 1 additionally comprising a plurality of reference symbols on said recording sheet, at least one reference symbol being positioned relative to each of said plurality of positive images, said at least one reference symbol being oriented on said recording sheet to be read without being up-side-down when said positive images are viewed right-side-up, whether said positive images are oriented toward said top edge or said bottom edge on said recording sheet.

3. An index print according to claim 2, wherein each said reference symbol is oriented sideways on said recording sheet relative to a corresponding one of said positive images, whether said positive images are oriented toward said top edge or said bottom edge on said recording sheet.

4. An index print according to claim 2, wherein there is a pair of said reference symbols for each of said positive images, one of said reference symbols of each pair being oriented right-side-up on said recording sheet relative to said positive images and another of said reference symbols of each pair being oriented up-side-down on said recording sheet relative to said positive images.

5. In combination with a photographic image recording medium having a plurality of images, an index print comprising:

a recording sheet having a top edge and a bottom edge;

between said top and bottom edges, a plurality of positive images on said recording sheet, said positive images corresponding to respective images on said photographic image recording medium, said plurality of positive images being oriented either right-side-up toward said top edge or up-side-down toward said bottom edge, depending on an orientation of said recording medium in a photographic camera in which the respective images were exposed;

a top header on said recording sheet, said top header having visible information oriented right-side-up toward said top edge;

a bottom header on said recording sheet, said bottom header having visible information oriented up-side-down toward said bottom edge; and whereby a person viewing said index print can orient said positive images right-side-up and be able to read one of said top header and said bottom header, without said one header being up-side-down as read.

6. An index print, comprising:

a recording sheet having a top edge and a bottom edge;

between said top and bottom edges, a plurality of positive images on said recording sheet, said positive images corresponding to respective images on a photographic image recording medium, said plurality of positive images being oriented either right-side-up toward said top edge or up-side-down toward said bottom edge, depending on an orientation of the recording medium in a photographic camera in which the respective images were exposed;

a plurality of reference symbols on said recording sheet, at least one reference symbol being positioned relative to each of said plurality of positive images, said at least one reference symbol being oriented on said recording sheet to be read without being up-side-down when said positive images are viewed right-side-up, whether said positive images are oriented toward said top edge or said bottom edge on said recording sheet, whereby a person viewing said index print can orient said positive images right-side-up and be able to read at least one reference symbol relative to each of said plurality of positive images without said at least one reference symbol being up-side-down as read.

7. An index print according to claim 6, wherein each said reference symbol is oriented sideways on said recording sheet relative to a corresponding one of said positive images, whether said positive images are oriented toward said top edge or said bottom edge on said recording sheet.

8. An index print according to claim 6, wherein there is a pair of said reference symbols for each of said positive images, one of said reference symbols of each pair being oriented right-side-up on said recording sheet relative to said positive images and another of said reference symbols of each pair being oriented up-side-down on said recording sheet relative to said positive images.

9. A method of recording an index print, comprising:

reading a plurality of images from a recording medium;

printing the read plurality of images on a recording sheet having a top edge and a bottom edge, at a position between said top and bottom edges, said printed images being oriented either right-side-up toward said top edge or up-side-down toward said bottom edge;

providing a top header on said recording sheet, said top header having visible information oriented right-side-up toward said top edge; and providing a bottom header on said recording sheet which is oriented up-side-down toward said bottom edge;

whereby a person viewing said index print can orient said printed images right-side-up and be able to read one of said top header and said bottom header, without said one header being up-side-down as read.

10. An index print and image recording medium according to claim 9, wherein the index print additionally comprises a plurality of reference symbols on said recording sheet, at least one reference symbol being positioned relative to each of said plurality of positive images, said at least one reference symbol being oriented on said recording sheet to be read without being up-side-down when said positive images are viewed right-side-up, whether said positive images are oriented toward said top edge or said bottom edge on said recording sheet.

11. An index print and image recording medium according to claim 10, wherein each said reference symbol is oriented sideways on said recording sheet relative to a corresponding one of said positive images, whether said positive images are oriented toward said top edge or said bottom edge on said recording sheet.

12. An index print and image recording medium according to claim 10, wherein the index print has a pair of said reference symbols for each of said positive images, one of said reference symbols of each pair being oriented right-side-up on said recording sheet relative to said positive images and another of said reference symbols of each pair being oriented up-side-down on said recording sheet relative to said positive images.

13. A method according to claim 12 additionally comprising providing a plurality of reference symbols on said recording sheet, at least one reference symbol being positioned relative to each of said printed images, said at least one reference symbol being oriented on said recording sheet to be read without being up-side-down when said printed images are viewed right-side-up, whether said printed images are oriented toward said top edge or said bottom edge on said recording sheet.

14. A method according to claim 13, wherein each said reference symbol is oriented sideways on said recording sheet relative to a corresponding one of said printed images, whether said printed images are oriented toward said top edge or said bottom edge on said recording sheet.

15. A method according to claim 13, wherein there is a pair of said reference symbols for each of said printed images, one of said reference symbols of each pair being oriented right-side-up on said recording sheet relative to said printed images and another of said reference symbols of each pair being oriented up-side-down on said recording sheet relative to said printed images.

16. A method according to claim 12 wherein the printed images are positive images.

17. A method of recording an index print, comprising:

reading a plurality of images from a recording medium;

printing the read images on a recording sheet having a top edge and a bottom edge, at a position between said top and bottom edges, said printed images being oriented either right-side-up toward said top edge or up-side-down toward said bottom edge;

providing a plurality of reference symbols on said recording sheet, at least one reference symbol being positioned relative to each of said plurality of printed images, said at least one reference symbol being oriented on said recording sheet to be read without being up-side-down when said printed images are viewed right-side-up, whether said printed images are oriented toward said top edge or said bottom edge on said recording sheet, whereby a person viewing said index print can orient said printed images right-side-up and be able to read at least one reference symbol relative to each of said plurality of printed images without said at least one reference symbol being up-side-down as read.

18. A method according to claim 17, wherein each said reference symbol is oriented sideways on said recording sheet relative to a corresponding one of said printed images, whether said printed images are oriented toward said top edge or said bottom edge on said recording sheet.

19. A method according to claim 17, wherein there is a pair of said reference symbols provided for each of said printed images, one of said reference symbols of each pair being oriented right-side-up on said recording sheet relative to said printed images and another of said reference symbols of each pair being oriented up-side-down on said recording sheet relative to said printed images.

20. A method according to claim 17 wherein the printed images are positive images.

\* \* \* \* \*